(12) United States Patent
Wood et al.

(10) Patent No.: US 9,449,007 B1
(45) Date of Patent: Sep. 20, 2016

(54) CONTROLLING ACCESS TO XAM METADATA

(75) Inventors: Douglas A. Wood, Westford, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 174 days.

(21) Appl. No.: 12/826,534

(22) Filed: Jun. 29, 2010

(51) Int. Cl.
*G06F 17/30* (2006.01)

(52) U.S. Cl.
CPC ..... *G06F 17/3012* (2013.01); *G06F 17/30082* (2013.01); *G06F 17/30085* (2013.01); *G06F 17/30115* (2013.01)

(58) Field of Classification Search
CPC ........... G06F 17/30115; G06F 3/0605; G06F 21/6218; G06F 17/30082; G06F 17/30091; G06F 3/067; G06F 3/0685; G06F 17/3012; G06F 17/30982; G06F 3/0689
USPC ....... 707/781, 705, 736, 755, 756, 785, 795, 707/802, 100
See application file for complete search history.

(56) References Cited

U.S. PATENT DOCUMENTS

| | | | |
|---|---|---|---|
| 7,627,617 B2 * | 12/2009 | Kavuri et al. | 707/999.001 |
| 7,702,639 B2 * | 4/2010 | Stanley et al. | 707/999.1 |
| 7,747,663 B2 * | 6/2010 | Atkin et al. | 707/822 |
| 7,836,053 B2 * | 11/2010 | Naef, III | 707/737 |
| 7,870,102 B2 * | 1/2011 | Haustein et al. | 707/661 |
| 7,899,850 B2 * | 3/2011 | Slik et al. | 707/822 |
| 7,979,478 B2 * | 7/2011 | Hiraiwa et al. | 707/821 |
| 7,984,512 B2 * | 7/2011 | Flaks et al. | 726/28 |
| 8,082,491 B1 * | 12/2011 | Abdelaziz et al. | 715/234 |
| 8,095,558 B2 * | 1/2012 | Barley et al. | 707/791 |
| 8,095,963 B2 * | 1/2012 | Bloesch | 726/4 |
| 8,107,100 B2 * | 1/2012 | Abraham et al. | 358/1.14 |
| 8,131,680 B2 * | 3/2012 | Prahlad et al. | 707/648 |
| 8,135,760 B1 * | 3/2012 | Todd et al. | 707/812 |
| 8,146,155 B1 * | 3/2012 | Todd et al. | 726/21 |
| 8,260,886 B2 * | 9/2012 | Kling et al. | 709/220 |
| 8,327,419 B1 * | 12/2012 | Korablev et al. | 726/2 |
| 8,346,789 B2 * | 1/2013 | Klein, Jr. | G06F 17/30038 707/758 |
| 8,972,677 B1 * | 3/2015 | Jones | 711/161 |
| 2006/0004868 A1 * | 1/2006 | Claudatos et al. | 707/104.1 |
| 2006/0129599 A1 * | 6/2006 | Hammerich | G06F 8/437 707/999.107 |
| 2010/0094803 A1 * | 4/2010 | Yamakawa et al. | 707/609 |
| 2012/0078881 A1 * | 3/2012 | Crump et al. | 707/722 |

OTHER PUBLICATIONS

SNIA, "Information Management—Extensible Access Method (XAM)—Part 1: Architecture", Version 1.01, Jun. 19, 2009, pp. ii-171, http://www.snia.org/sites/default/files/XAM_Arch_v1.01.pdf.*

* cited by examiner

*Primary Examiner* — Dangelino Gortayo
(74) *Attorney, Agent, or Firm* — John T. Hurley; Jason A. Reyes; Krishnendu Gupta

(57) ABSTRACT

A method is used in controlling access to XAM metadata. An object derived from a set of content is stored in an object addressable data storage system. The object has an object identifier. Storage system specific metadata is added to the object. The storage system specific metadata is accessible when the object is retrieved using the object identifier. Based on sub-object access control, a retrieving application is allowed to have access to only a subset of the object.

20 Claims, 16 Drawing Sheets

XSET
80

CONTROLLING ACCESS TO XAM METADATA

BACKGROUND

1. Technical Field of the Invention

The present invention relates to controlling access to XAM metadata.

2. Description of Related Art

Storage devices are employed to store data that is accessed by computer systems. Examples of basic storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller.

As is known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

A storage device may also be accessible over a network. Examples of such a storage device include network attached storage (NAS) and storage area network (SAN) devices. A storage device may be a single stand-alone component or be comprised of a system of storage devices such as in the case of Redundant Array of Inexpensive Disks (RAID) groups.

Virtually all computer application programs rely on such storage devices which may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume ("LUN") and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

The eXtensible Access Method (XAM) proposal is a proposed standard, that employs content addressable storage techniques, that is being developed jointly by members of the storage industry and provides a specification for storing and accessing content and metadata associated with the content. In accordance with XAM, an "XSet" is a logical object that can be defined to include one or more pieces of content and metadata associated with the content, and the XSet can be accessed using a single object identifier (referred to as an XUID). As used herein, a logical object refers to any logical construct or logical unit of storage, and is not limited to a software object in the context of object-oriented systems.

As discussed above, an XSet can store one or more pieces of content. For example, an XSet can be created to store a photograph and the photograph itself can be provided as a first "stream" to the XSet. One or more files (e.g., text files) can be created to include metadata relating to the photograph, and the metadata file(s) can be provided to the XSet as one or more additional streams. Once the XSet has been created, a XUID is created for it so that the content (e.g., the photograph) and its associated metadata can thereafter be accessed using the single object identifier (e.g., its XUID). A diagram of an illustrative XSet 100 is shown in FIG. 1. As shown in FIG. 1, XSet 100 includes a number of streams for storing user provided content and metadata. The XSet may also include a number of additional fields 103 that store other types of metadata for the XSet, such as, for example, the creation time for the XSet, the last access time of access of the XSet, and/or any retention period for the XSet.

In XAM, each field or stream in an XSet may be designated as binding or non-binding. Binding fields and streams are used in computing the XUID for the XSet, while non-binding fields and streams are not. That is, the XUID for an XSet is computed based on the content of the binding fields and streams (e.g., by hashing the content of these fields and streams), but not based on the non-binding fields and streams. The designation of certain fields and/or stream as binding may change. Re-designating as binding a field or stream that had been previously designated as non-binding causes the XUID for the XSet to change. Similarly, re-designating a field or stream as non-binding that had previously been designated as binding causes the XUID for the XSet to change.

Because the XUID for an XSet is generated using the content of the binding fields and streams, the binding fields and streams of the XSet cannot be changed once the field becomes binding (though these fields and streams can be re-designated as non-binding and then changed). A request to modify a binding field or stream will result in a new XSet with a different XUID being created.

Some storage systems receive and process access requests that identify data organized by file system. A file system is a logical construct that translates physical blocks of storage on a storage device into logical files and directories. In this way, the file system aids in organizing content stored on a disk. For example, an application program having ten logically related blocks of content to store on disk may store the content in a single file in the file system. Thus, the application program may simply track the name and/or location of the file, rather than tracking the block addresses of each of the ten blocks on disk that store the content.

File systems maintain metadata for each file that, inter alia, indicates the physical disk locations of the content logically stored in the file. For example, in UNIX file systems an inode is associated with each file and stores metadata about the file. The metadata includes information such as access permissions, time of last access of the file, time of last modification of the file, and which blocks on the physical storage devices store its content. The file system may also maintain a map, referred to as a free map in UNIX file systems, of all the blocks on the physical storage system at which the file system may store content. The file system tracks which blocks in the map are currently in use to store file content and which are available to store file content.

When an application program requests that the file system store content in a file, the file system may use the map to select available blocks and send a request to the physical storage devices to store the file content at the selected blocks. The file system may then store metadata (e.g., in an inode) that associates the filename for the file with the physical location of the content on the storage device(s). When the file system receives a subsequent request to access the file, the file system may access the metadata, use it to determine the blocks on the physical storage device at which the file's content is physically stored, request the content from the physical storage device(s), and return the content in response to the request.

In general, since file systems provide computer application programs with access to data stored on storage devices in a logical, coherent way, file systems hide the details of how data is stored on storage devices from application programs. For instance, storage devices are generally block addressable, in that data is addressed with the smallest granularity of one block; multiple, contiguous blocks form an extent. The size of the particular block, typically 512 bytes in length, depends upon the actual devices involved. Application programs generally request data from file systems byte by byte. Consequently, file systems are responsible for seamlessly mapping between application program address-space and storage device address-space.

File systems store volumes of data on storage devices, i.e., collections of data blocks, each for one complete file system instance. These storage devices may be partitions of single physical devices or logical collections of several physical devices. Computers may have access to multiple file system volumes stored on one or more storage devices.

File systems maintain several different types of files, including regular files and directory files. Application programs store and retrieve data from regular files as contiguous, randomly accessible segments of bytes. With a byte-addressable address-space, applications may read and write data at any byte offset within a file. Applications can grow files by writing data to the end of a file; the size of the file increases by the amount of data written. Conversely, applications can truncate files by reducing the file size to any particular length. Applications are solely responsible for organizing data stored within regular files, since file systems are not aware of the content of each regular file.

Files are presented to application programs through directory files that form a tree-like hierarchy of files and subdirectories containing more files. Filenames are unique to directories but not to file system volumes. Application programs identify files by pathnames comprised of the filename and the names of all encompassing directories. The complete directory structure is called the file system namespace. For each file, file systems maintain attributes such as ownership information, access privileges, access times, and modification times.

Many file systems utilize data structures mentioned above called inodes to store information specific to each file. Copies of these data structures are maintained in memory and within the storage devices. Modes contain attribute information such as file type, ownership information, access permissions, access times, modification times, and file size. Modes also contain lists of pointers that address data blocks. These pointers may address single data blocks or address an extent of several consecutive blocks. The addressed data blocks contain either actual data stored by the application programs or lists of pointers to other data blocks. With the information specified by these pointers, the contents of a file can be read or written by application programs. When an application programs write to files, data blocks may be allocated by the file system. Such allocation modifies the inodes.

Additionally, file systems maintain information, called "allocation tables", that indicate which data blocks are assigned to files and which are available for allocation to files. File systems modify these allocation tables during file allocation and de-allocation. Most modern file systems store allocation tables within the file system volume as bitmap fields. File systems set bits to signify blocks that are presently allocated to files and clear bits to signify blocks available for future allocation.

The terms real-data and metadata classify application program data and file system structure data, respectively. In other words, real-data is data that application programs store in regular files. Conversely, file systems create metadata to store volume layout information, such as inodes, pointer blocks (called indirect blocks), and allocation tables (called bitmaps). Metadata may not be directly visible to applications.

A file may have other descriptive and referential information, i.e., other file metadata, associated with it. This information may be relative to the source, content, generation date and place, ownership or copyright notice, central storage location, conditions to use, related documentation, applications associated with the file or services.

Today there are different approaches for implementing the association of a file with metadata of that file. Basically, metadata of a file can be encoded onto the same filename of the file, they can be prepended or appended onto the file as part of a file wrapper structure, they can be embedded at a well-defined convenient point elsewhere within the file, or they can be created as an entirely separate file.

I/O interfaces transport data among the computers and the storage devices. Traditionally, interfaces fall into two categories: channels and networks. Computers generally communicate with storage devices via channel interfaces. Channels predictably transfer data with low-latency and high-bandwidth performance; however, channels typically span short distances and provide low connectivity. Performance requirements often dictate that hardware mechanisms control channel operations. The Small Computer System Interface (SCSI) is a common channel interface. Storage devices that are connected directly to computers are known as direct-attached storage (DAS) devices.

Computers communicate with other computers through networks. Networks are interfaces with more flexibility than channels. Software mechanisms control substantial network operations, providing networks with flexibility but large latencies and low bandwidth performance. Local area networks (LAN) connect computers medium distances, such as within buildings, whereas wide area networks (WAN) span long distances, like across campuses or even across the world. LANs normally consist of shared media networks, like Ethernet, while WANs are often point-to-point connections, like Asynchronous Transfer Mode (ATM). Transmission Control Protocol/Internet Protocol (TCP/IP) is a popular network protocol for both LANs and WANs. Because LANs and WANs utilize very similar protocols, for the purpose of this application, the term LAN is used to include both LAN and WAN interfaces.

Recent interface trends combine channel and network technologies into single interfaces capable of supporting multiple protocols. For instance, Fibre Channel (FC) is a serial interface that supports network protocols like TCP/IP as well as channel protocols such as SCSI-3. Other technologies, such as iSCSI, map the SCSI storage protocol onto TCP/IP network protocols, thus utilizing LAN infrastructures for storage transfers.

In at least some cases, SAN refers to network interfaces that support storage protocols. Storage devices connected to SANs are referred to as SAN-attached storage devices. These storage devices are block and object-addressable and may be dedicated devices or general purpose computers serving block and object-level data.

Distributed file systems provide users and application programs with transparent access to files from multiple computers networked together. Distributed file systems may lack the high-performance found in local file systems due to resource sharing and lack of data locality. However, the sharing capabilities of distributed file systems may compensate for poor performance.

Architectures for distributed file systems fall into two main categories: NAS-based and SAN-based. NAS-based file sharing places server computers between storage devices and client computers connected via LANs. In contrast, SAN-based file sharing, traditionally known as "shared disk" or "share storage", uses SANs to directly transfer data between storage devices and networked computers.

NAS-based distributed file systems transfer data between server computers and client computers across LAN connections. The server computers store volumes in units of blocks on DAS devices and present this data to client computers in a file-level format. These NAS servers communicate with NAS clients via NAS protocols. Both read and write datapaths traverse from the clients, across the LAN, to the NAS servers. In turn, the servers read from and write to the DAS devices. NAS servers may be dedicated appliances or general-purpose computers.

NFS is a common NAS protocol that uses central servers and DAS devices to store real-data and metadata for the file system volume. These central servers locally maintain metadata and transport only real-data to clients. The central server design is simple yet efficient, since all metadata remains local to the server. Like local file systems, central servers only need to manage metadata consistency between main memory and DAS devices. In fact, central server distributed file systems often use local file systems to manage and store data for the file system. In this regard, the only job of the central server file system is to transport real-data between clients and servers.

SAN appliances are prior art systems that consist of a variety of components including storage devices, file servers, and network connections. SAN appliances provide block-level, and possibly file-level, access to data stored and managed by the appliance. Despite the ability to serve both block-level and file-level data, SAN appliances may not possess the needed management mechanisms to actually share data between the SAN and NAS connections. The storage devices are usually partitioned so that a portion of the available storage is available to the SAN and a different portion is available for NAS file sharing. Therefore, for the purpose of this application, SAN appliances are treated as the subsystems they represent.

Another adaptation of a SAN appliance is simply a general purpose computer with DAS devices. This computer converts the DAS protocols into SAN protocols in order to serve block-level data to the SAN. The computer may also act as a NAS server and serve file-level data to the LAN.

File system designers can construct complete file systems by layering, or stacking, partial designs on top of existing file systems. The new designs reuse existing services by inheriting functionality of the lower level file system software. For instance, NFS is a central-server architecture that utilizes existing local file systems to store and retrieve data from storage device attached directly to servers. By layering NFS on top of local file systems, NFS software is free from the complexities of namespace, file attribute, and storage management. NFS software consists of simple caching and transport functions. As a result, NFS benefits from performance and recovery improvements made to local file systems.

Most modern operating systems include installable file system interfaces to support multiple file system types within a single computer. In UNIX, the Virtual File System (VFS) interface is an object-oriented, installable interface. While several UNIX implementations incorporate VFS, the interfaces differ slightly between platforms. Several non-UNIX operating systems, such as Microsoft Windows NT, have interfaces similar to VFS.

VFS occupies the level between the system call interface and installed file systems. Each installed file system provides the UNIX kernel with functions associated with VFS and vnode operations. VFS functions operate on whole file systems to perform tasks such as mounting, unmounting, and reading file system statistics. Vnode operations manipulate individual files. Vnode operations include opening, closing, looking up, creating, removing, reading, writing, and renaming files.

Vnode structures are the objects upon which vnode functions operate. The VFS interface creates and passes vnodes to file system vnode functions. A vnode is the VFS virtual equivalent of an inode. Each vnode maintains a pointer called "v_data" to attached file system specific, in-core memory structures such as inodes.

Many file system interfaces support layering. With layering, file systems are capable of making calls to other file systems through the virtual file system interface. For instance, NFS server software may be implemented to access local file systems through VFS. In this manner, the server software does not need to be specifically coded for any particular local file system type; new local file systems may be added to an operating system without reconfiguring NFS.

A tape library consists of a housing in which is included a robot and a number of resources, defined by their element address and their function, namely a number of tape drives (or data transfer elements), plural normal tape slots (or storage elements) and at least one import/export slot (or import/export element). Tape slots typically are tape receptacles in the walls of the housing, and import/export elements typically are receptacles in a door of the housing, which allow tape cassettes to be introduced into and taken from the library by a human operator. Each tape drive typically has a SCSI connection to a single host computer. The host also sends SCSI commands to control the robot to move tapes between the tape slots, tape drives and import/export slots. Tape libraries, or more particularly the robot thereof, are able, typically in response to a request from the host, to determine what tapes it contains in which slots, and to convey this information to the host along with information concerning the number of tape drives, normal slots and import/export slots that it has.

A virtual tape storage system is a hardware and software product configured to interact with a host computer. Application programs running on the host computer store data output on tape volumes for storage. These tape volumes are embodied in the virtual tape storage system as virtual volumes on virtual tape drives. A virtual volume is a collection of data, organized to appear as a normal tape volume, residing in the virtual tape storage system. To the host computer and to the application programs, the tape volume contents appear to be stored on a physical tape device of a particular model, with the properties and behavior of that model emulated by the actions of the virtual tape storage system. However, the data may actually be stored as a virtual volume on any of a variety of different storage mediums such as disk, tape, or other non-volatile storage media, or combinations of the above. The virtual volume may be spread out over multiple locations, and copies or "images" of the virtual volume may be stored on more than one kind of physical device, e.g., on tape and on disk.

At least some OAS systems have virtual pools (also referred to as object pools) to enable system administrators to segregate data at an object-by-object level into logical groups and provide access control on that basis to applications. Pool-bound rights are granted by the system administrator to an access profile. They determine which operations an application can perform on the pool data. Possible capabilities are write (w), read (r), delete (d), exist (e), privileged delete (D), query (q), clip copy (c), purge (p), and litigation hold (h). Examples of virtual pools are described in U.S. Pat. No. 7,734,886 to Van Riel, et al., issued Jun. 8, 2010, entitled "Controlling access to content units stored on an object addressable storage system", assigned to EMC Corporation (Hopkinton, Mass.), which is hereby incorporated herein by reference in its entirety.

SUMMARY OF THE INVENTION

A method is used in controlling access to XAM metadata. An object derived from a set of content is stored in an object addressable data storage system. The object has an object identifier. Storage system specific metadata is added to the object. The storage system specific metadata is accessible when the object is retrieved using the object identifier. Based on sub-object access control, a retrieving application is allowed to have access to only a subset of the object.

BRIEF DESCRIPTION OF THE DRAWINGS

Additional features and advantages of the invention will be described below with reference to the drawings, in which.

Figure 1:
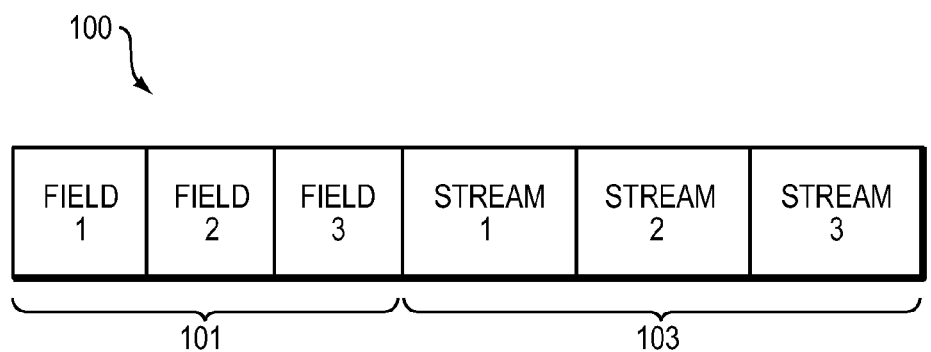
FIGS. 1, 8, 10, 12, 15-16 are diagrams of data structures for use in applying XAM processes.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT(S)

Described below is a technique for use in controlling access to XAM metadata, which technique may be used to help provide, among other things, filtered transiently attached metadata within indexed storage systems. In at least one implementation, an indexed storage system employs object processes to attach metadata to content arriving via different protocols, and the indexed storage system automatically adds transient metadata to and/or removes transient metadata from this content over time. In such implementations, use of the technique to help provide filtered transiently attached metadata allows for controlling the hiding and/or showing of transient metadata in such a manner that, for example, clients retrieving object content cannot access internally generated transient metadata.

Conventionally, systems providing a view into content and attached metadata lack mechanisms for controlling access to subsets of portions of metadata. Similarly, conventional systems do not allow one client to attach metadata to an object such that the metadata is inaccessible to other clients that can view the same object.

By contrast, use of the technique described herein allows multiple clients (as well as an indexed storage system itself) to attach metadata that cannot be accessed by other clients.

Figure 2:
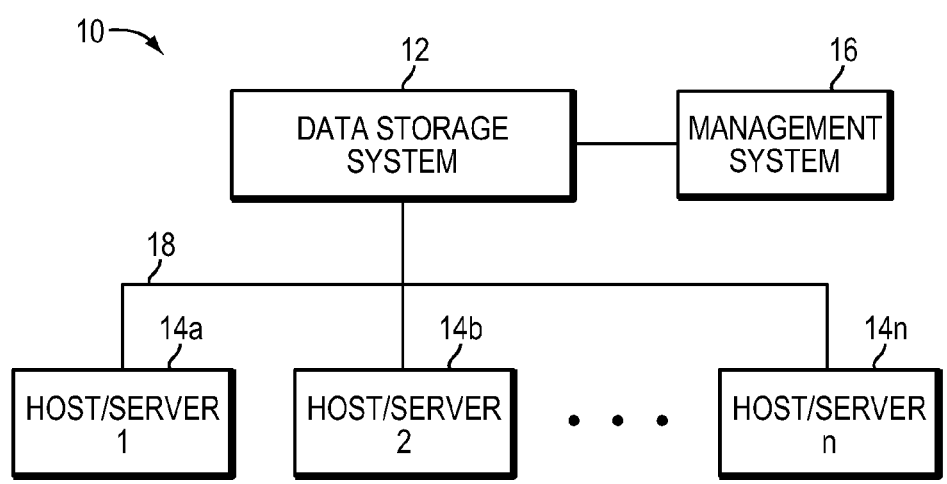
FIGS. 2-7, 9, 11, 13-14 are block diagrams of one or more data storage systems for use with one or more of the data structures of FIGS. 1, 8, 10, 12, 15-16.

Referring to FIG. 2, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 18. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 18 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 18 by any one of variety of connections in accordance with the type of communication medium 18. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 2 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 2, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In at least one embodiment, the one or more data storage systems 12 of FIG. 2 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 2 is implemented using one or more data storage systems, each of the data storage systems may include code thereon for performing the techniques as described herein. Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 2 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms. For example, a first data storage system may include the common software environment with a first operating system and underlying hardware. A second data storage system may include the common software environment with a different operating system and different underlying hardware.

The common software environment includes a framework which may be implemented using APIs (application programming interface) and other code modules. The APIs may implement the underlying functionality which varies with the different possible data storage system hardware and software platforms.

Figure 3:
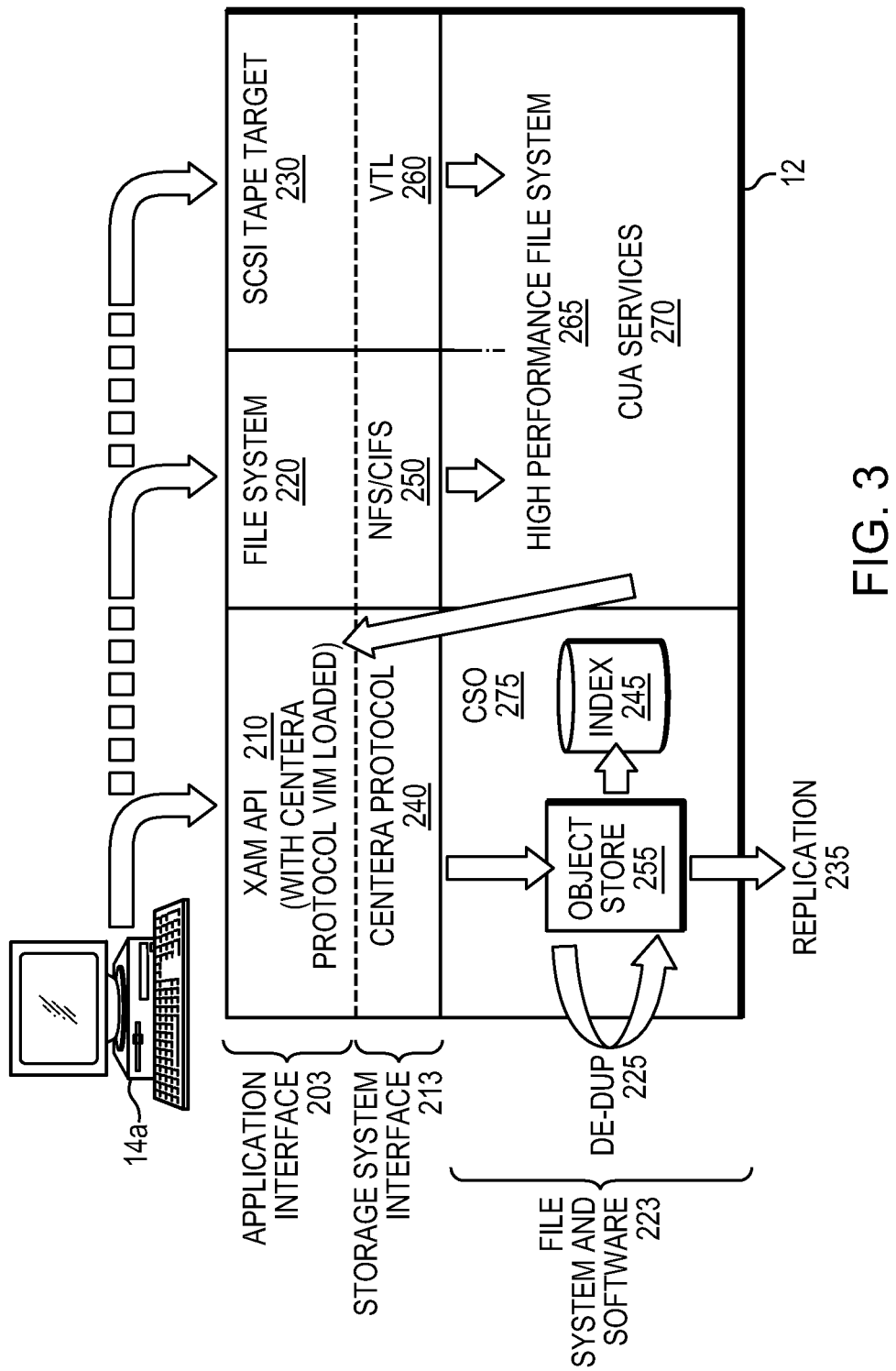

With reference to FIG. 3, in an example implementation, system 12 is a multi-interface, multi-protocol storage system that may be used as a general purpose storage system and/or as a special purpose storage system, e.g., an archival storage system that integrates multiple different types of archival and backup technology into one. In at least one case, system 12 has a component architecture and is Linux based.

System 12 has an application interface 203, a storage system interface 213, and file system and software 223. For use in communicating with applications, e.g., running on host 14a, application interface 203 provides three interfaces: XAM API 210 (with Centera Protocol VIM loaded) which is object based; file system based interface 220; and block-based (e.g., SCSI Tape Target) interface 230. (Vendor Interface Modules (VIMs) are software modules that have a standard interface that converts XAM requests into native requests supported by the underlying hardware systems. For example, a XAM API call that is routed to the Centera Protocol VIM is converted to the Centera protocol and sent to Centera functionality.)

For communicating with underlying storage system resources, storage system interface 213 includes Centera Protocol 240, NFS/CIFS 250, and virtual tape library (VTL) 260 interfaces corresponding to the XAM 210, file system 220, and block-based 230 interfaces respectively. (Common Internet File System (CIFS) is a network file access protocol.)

With reference to "the OAS applications" as defined further below, file system and software 223 includes CSO (Centera Software Only) software 275 and other software used as described below with Centera Protocol interface 240, and High Performance File System software 265 and Centera Universal Access (CUA) services software 270 for use as described below with interfaces 250, 260.

With respect to data ingest mechanics of system 12, data may be ingested through XAM API 210, file system interface 220, and block-based interface 230.

Figure 4:
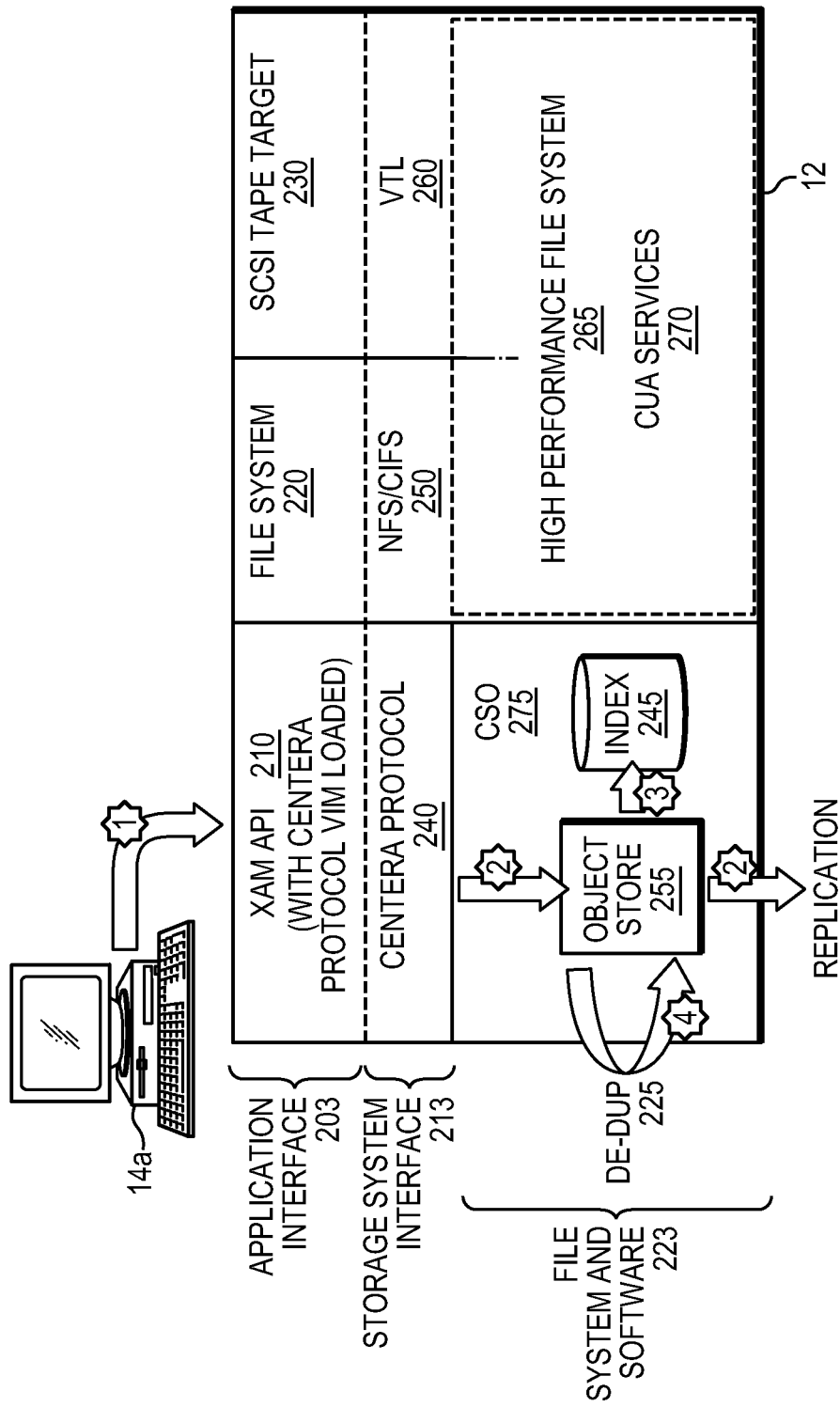

With reference now to FIG. 4, now described is an example of ingestion through XAM API 210. An application (e.g., running on host 14a) creates XAM object (XSet) and stores it using XAM API 210. CSO software 275 converts the resulting data stream into local files in object store 255 and replicates 235 the XSets as they are ingested. In at least some cases, such object based replication means that no backup is required. Also, this leverages "universal migrator" capabilities of XAM such that a replication target may be any XAM device. Metadata (and optionally, object content) is indexed for later query access using index 245. Data is de-duplicated 225 asynchronously in place. Thus, if backup is desired, de-duplication results in reduced network (e.g., wide area network) traffic. Additional de-duplication can also be provided by integrating de-duplication technology into the VIM.

Figure 5:
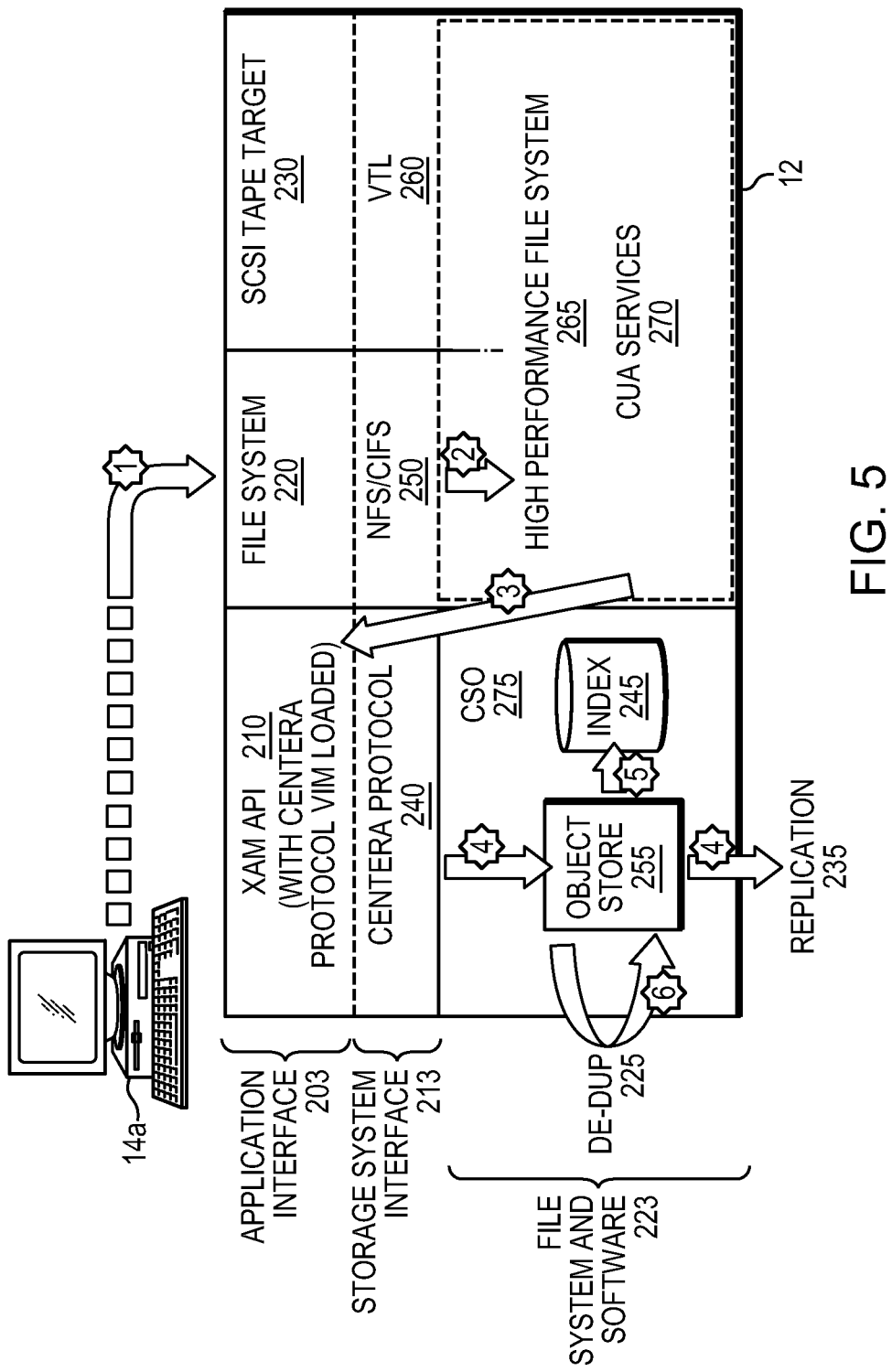

With reference now to FIG. 5, now described is an example of ingestion through file system interface 220. An application (e.g., running on host 14a) creates a file using file system interface 220. NFS/CIFS interface 250 converts the resulting data stream to a local file supported by High Performance File System software 265. CUA services 270 serves as an application communicating with XAM API 210 and asynchronously causes the local file to be converted to an XSet and stored using XAM API 210. On conversion, path and filename are included in the XSet as nonbinding metadata. Time before such conversion is tunable to accommodate service level agreements about replication speed.

Thereafter this XSet is handled in the same way as the XSet described in the above example of ingestion through XAM API 210, including use of object store 255 and index 245 and appropriate indexing, replication, and de-duplication as described above. XUIDs are stored by High Performance File System software 265 to enable continued access to data after XAM conversion.

Note that in at least one implementation, data ingested via XAM only (as described above in connection with FIG. 4) is not visible through file system interface 220 and NFS/CIFS interface 250, but data ingested via file system interface 220 and NFS/CIFS interface 250 is visible through XAM API 210.

Figure 6:
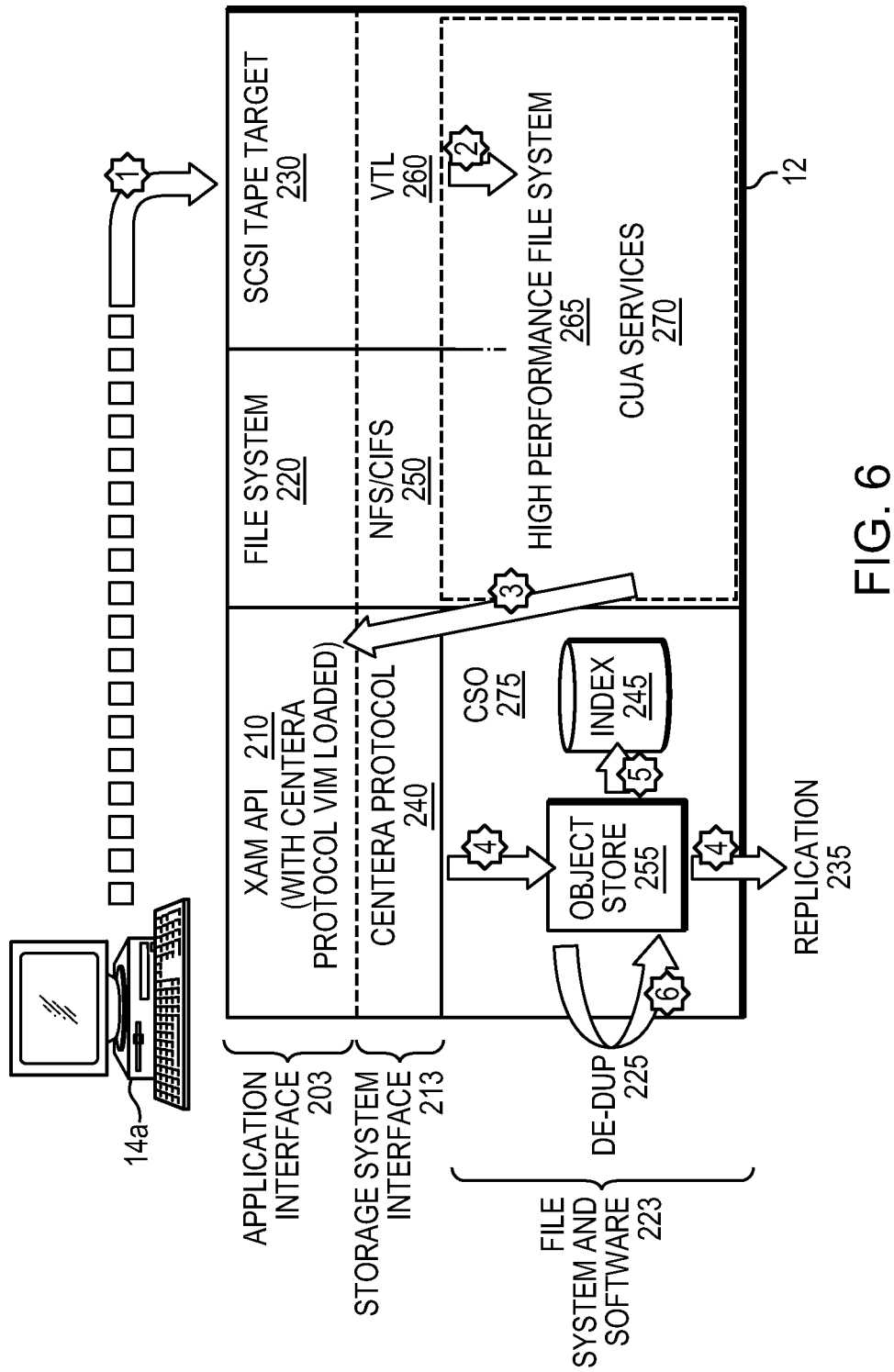

With reference now to FIG. 6, now described is an example of ingestion through block-based interface 230, wherein the example relates to a virtual tape library application. An application (e.g., running on host 14a) writes a file to SCSI tape (virtual, in this case) using interface 230. Virtual Tape Library interface 260 converts the resulting data stream to a local file supported by High Performance File System software 265. CUA services 270 serves as an application communicating with XAM API 210 and asynchronously causes the local file to be converted to an XSet and stored using XAM API 210.

Thereafter this XSet is handled in the same way as the XSet described in the above example of ingestion through XAM API 210, including use of object store 255 and index 245 and appropriate indexing, replication, and de-duplication as described above.

Note that in at least one implementation, data ingested via XAM only (as described above in connection with FIG. 4) is not visible through block-based interface 230 and Virtual Tape Library interface 260, but data ingested via block-based interface 230 and Virtual Tape Library interface 260 is visible through XAM API 210.

In at least one implementation, data ingested via file system interface 220 and NFS/CIFS interface 250 is not visible through block-based interface 230 and Virtual Tape Library interface 260, and data ingested via block-based interface 230 and Virtual Tape Library interface 260 is not visible through file system interface 220 and NFS/CIFS interface 250.

In at least one implementation, all data ingested by system 12 via any interface is visible at least through XAM API 210.

In at least one implementation, all data ingested by system 12 via any interface is unified in object store 255 and is indexed locally with index 245 to support scalable query and processing. With respect to unification of stored (e.g., archived) data, all data, universal services are available. XAM provides a job model to enable arbitrary jobs to be able to run on the data. These jobs include:

Query: A subset of SQL based on Documentum's DSQL is the query language used by XAM. XAM defines query support for both data and metadata.

Analysis: XAM fully supports mime types for all elements of data and metadata stored in its objects. Any rich information based on file type will be passed along to the XAM self describing format, allowing contextual analysis of data (e.g., face recognition on images files—this can be done by other applications due to the self-describing nature of the XSet).

Processing: Actions can be taken based on query and analysis. For example, a policy based job can be run that migrates all data on the system that has not been accessed for two years.

With respect to universal retention and disposition, default retention and disposition rules can be applied to NFS/CIFS and block-based (tape data) on ingest. Subsequent to ingest, rich policy management can be applied to this data through the XAM interface, such as litigation hold and release, retention policy review and modification on a per object basis or through wholesale policy management, and auto-disposition policy, which specifies what to do with content when its retention policy expires, and what to do when it is deleted.

With respect to universal migration, XAM provides a mechanism for migrating files from performance based pre-provisioned locations to location independent archived storage. True Hierarchical Storage Management (HSM) and policy driven lifecycle management is enabled. A self describing canonical format can include references to key stores, authentication warehouses, and policy information in a portable fashion. Any XAM device can be used as a migration destination.

Thus, no matter which protocol is used to ingest data, the data is stored using object-based storage processes, in combinations of objects and metadata, so that under the XAM protocol content can be stored and metadata can be associated along with it, and a unique object identifier can be returned back.

System 12 has object-based, file-based, and block-based capabilities all collapsed into one storage device that advertises all three protocols so that there are three different ways to ingest data into the storage system.

Host 14a has an application that has integrated with the XAM API and creates an XSet object and stores it using the XAM API. The XSet object includes content, e.g., x-ray information, doctor's notes, patient information, and is sent down through the XAM API to Centera protocol. The resulting data stream that comes in is put into local files (object store 255) and can be replicated immediately. At least the metadata that comes down in this object can be indexed and stored in a search and index type of database for queries later to find objects. Deduplication software 225 acts on store 255 such that as files are loaded into store 255, hashes are derived from the content and are compared to determine whether store 255 already has the content so that it need not be stored again.

With respect to the file system interface, the application creates a file, e.g., using commands fopen, write, close, and inside system 12 the file is stored as local file. CUA services converts the local file into a XAM XSet by calling XAM API and presenting the file and directing XAM API to turn the file into an object. Subsequently the same set of events occur that are experienced whenever writing directly to XAM API takes place, e.g., same replication, same deduplication possibilities. Accordingly, no matter which protocol is used, a same form of replication is used on the back end.

Thus, for example, advantageously, if a file needs to be retained for seven years, an application or user can access the XAM API, request the object for the file (e.g., x-ray data) that was stored, get the object, and turn retention on for seven years; subsequently within the seven years, when someone tries to delete the file, it cannot be deleted. Thus, files can be accessed as objects since system 12 turns the files into objects as soon as the files come into the system, and making the objects available via a different protocol (e.g., XAM). This also has other advantages such as shredding, wherein an application or user can go to the XSet via XAM API and turn shredding on for a particular object, and if someone deletes the corresponding file via the file system, system 12 will shred it.

Also, when a file is deleted, system 12 leaves behind a reflection indicating time and date and user for the deletion, so that, via the XAM API, an application or user can do a query of everything that has been deleted in last hour or over another time period.

In a specific example, a business scans or accepts mortgage applications, and stores them via the file system. Rules or regulations state how long the business must keep them or make them immutable (no alterations). If the business's document workflow application requires storing files in a file system and it is impractical or difficult to integrate the application with the XAM API, system 12 helps the business with compliance with the rules or regulations.

After system 12 has completed storing a new file as an object in store 255, the file system of High Performance File System 265 stores only the XUID (object ID) corresponding to the file, so that, for example, if an application running on host 14a needs to open the file, High Performance File System software uses the object ID to retrieve the corresponding object from XAM API, unpacks the file from the object, and returns the file to the application.

Similarly, in the case of SCSI tape, a file is written by the application to a SCSI tape device (as virtually presented by system 12), VTL converts the file to the local file system, and CUA services causes it to be converted to a XAM XSet and the remaining steps are same the same as in the case of the file system.

No matter which protocol is used for ingestion, indexing is provided, so that if, for example, a file is lost according to the VTL interface, an application or user can check for it via the XAM API and can restore it via the XAM API. In at least one implementation, indexing is accomplished by making a pass over the file and pulling out keywords and indexing them, i.e., indexing content on the fly, along with any metadata that comes with file, e.g., where is it in the file system, SCSI tape number.

When CUA services indicates it has a file that was backed up to tape that is to be packaged as an XSet object, additional metadata may be stored, e.g., tape number, SCSI ID.

XAM API supports searching through a pool of objects by keyword, and system 12 may implement index 245 as local storage.

Since all objects can be accessed through XAM API regardless of the protocol used for ingest, such objects can be supported by XAM's set of services, e.g., query processing, application of policies regarding universal retention, litigation hold, disposal. In addition, such objects can benefit from universal migration, since XAM is vendor neutral migration such that objects when exported are converted to a vendor neutral format (e.g., the self describing canonical format) which can be ingested by any other XAM device. This can be used, e.g., for technology refresh or to a different revision of the same file system.

Figure 7:
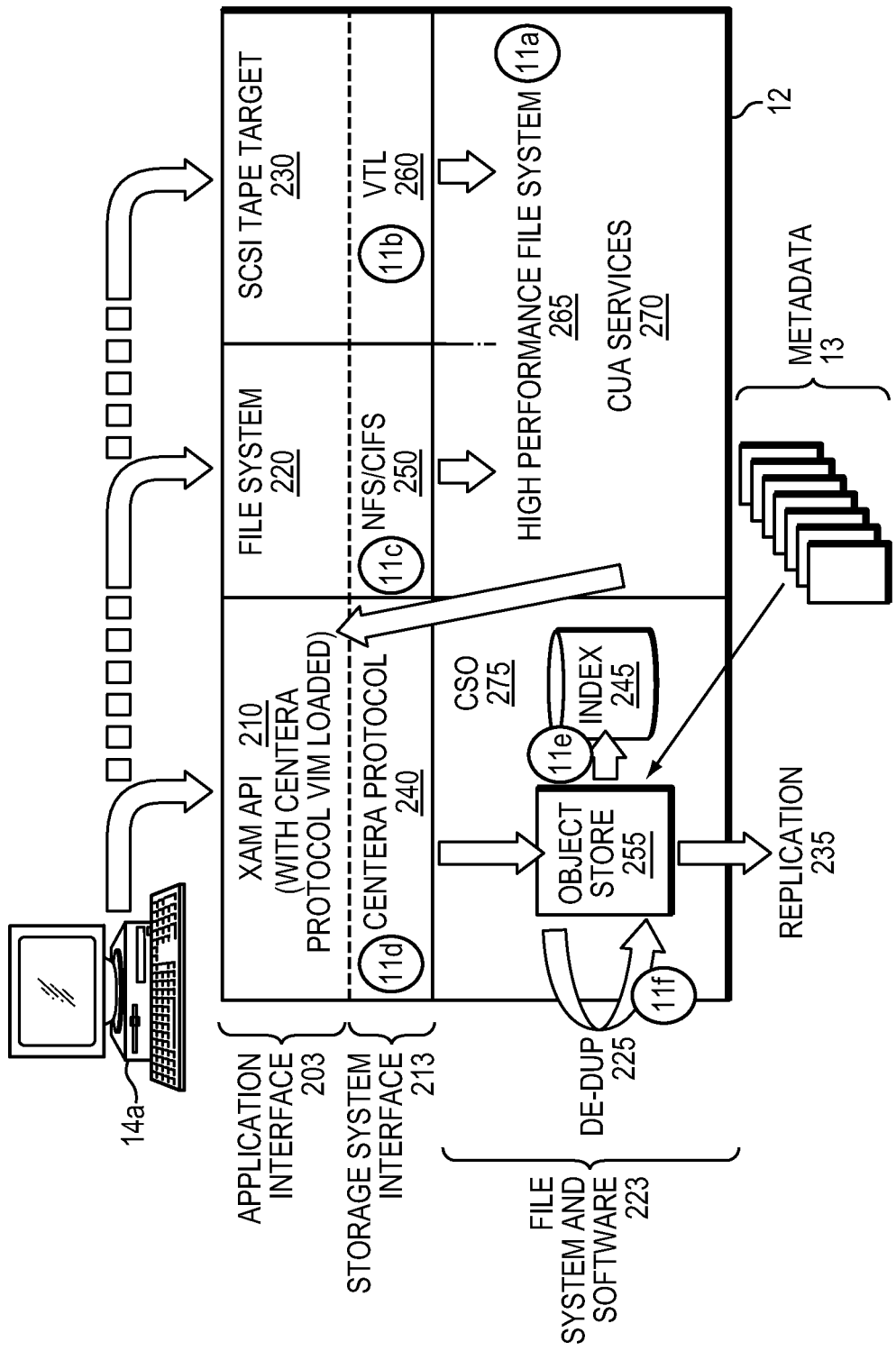

With reference now to FIG. 7, now described is an example of managing metadata. One or more metadata generation entities 11a-11f (e.g., software or other logic) are positioned logically at boundaries of protocols that are coming into the system as well as at different locations within the system as the system performs different activities. As described below, each entity 11a-11f generates additional valuable metadata 13 that is attached to a XAM object or a Centera object.

For example, with respect to entity 11a and CUA services 270, when a file comes in through file system interface 220, the file is initially stored in the local file system supported by software 265, and then CUA services 270 moves the file over to object store 255 as described above. Entity 11a keeps track of every time the file moves over to store 255, and every time it moves back, for example. When someone tries to access the file through the file system interface, it may need to be restaged from store 255 into the local file system, and entity 11a or related software (e.g., a daemon) may monitor such activity and maintain an audit log of such restaging and other movements of the file, which may be valuable to a user outside system 12 or other logic inside system 12 that needs such information about operations within system 12.

Such entities 11a-11f may be directed to different points throughout system 12 where different metadata is generated transiently over time automatically without any involvement of an external client such as a user or software external to system 12.

Conventionally, a XAM object only contains what was provided by the client that caused creation of the XAM object; for example, a client may create a XAM object, include within the XAM object an X-ray and metadata about the patient's name and doctor and when the X-ray was taken, and may cause the XAM object to be sent down to the storage system. Subsequently in the conventional case, the next time the client fetches the XAM object, the client is aware of the fields that are in the XAM object and can access them and there is nothing else the client needs to look at.

The initial metadata and content the client has put in the XAM object is not affected, and applications can continue to function and use the XAM object in conventional ways, but it is possible to not only review the content but also harvest a new set of internal statistics and analytics about the content and XAM object that can be used in any of a variety of ways.

Metadata 13 may be stored in any of multiple different ways, and the client does not necessarily see all of metadata 13 since it is only aware of what it put in the XAM object.

However, another application that is aware of this storage system behavior resulting from entities 11a-11f may fetch the XAM object (e.g., X-ray) and, for example, may use metadata 13 to analyze movement information between store 255 and the local file system. In particular, the application may review an audit log regarding how many times the file has been subject to such movements. The audit log may be included in metadata and may be part of the metadata of the XAM object, effectively hidden as described below from the client that generated the XAM object's content (e.g., X-ray).

Figure 8:
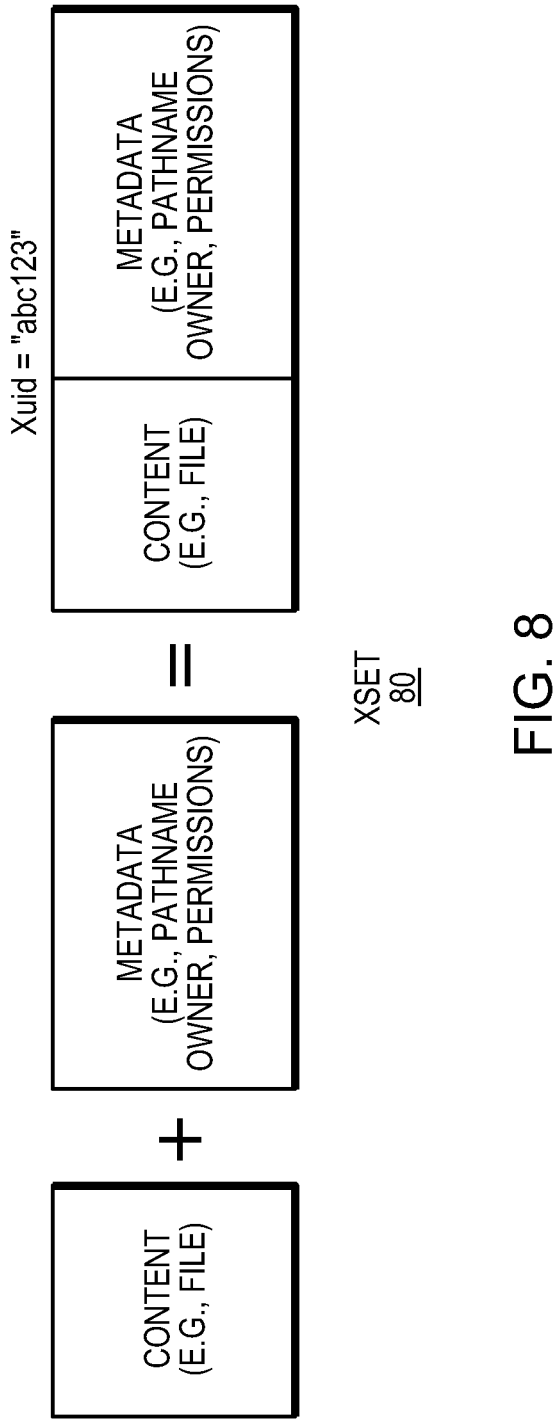

FIG. 8 illustrates an example XSet 80 that includes content (e.g., X-ray) and metadata and has a XUID "abc123". As described above, when the client writes a file into the file system, system 12 can on ingest capture metadata such as pathname of the file, who owns the file, permissions of the file, and attach that and store that in XAM.

Figure 9:
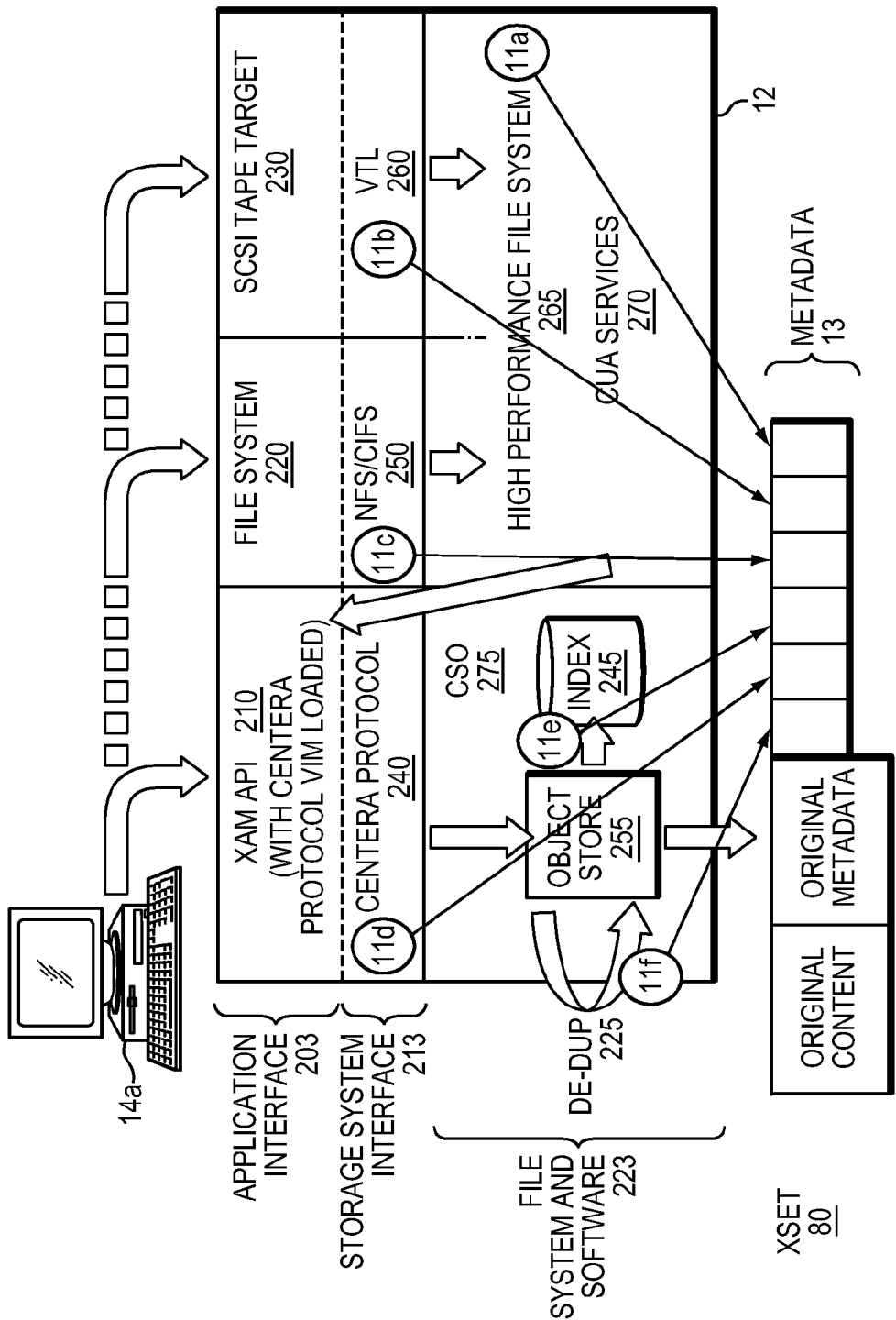

FIG. 9 illustrates XSet 80 and entities 11a-11f that add their own internal storage system metadata to XSet 80. XAM allows this to be done without changing the XUID content address (e.g., "abc123"), and allows the XAM object to be grown by adding new fields and data and indicating to XAM that these additions are nonbinding, which means the additions do not affect the content address. This result is workable because the content address continues to protect the object's original data, effectively as a hash value so that when the client reads the content back, it is confirmed that the content is the same as what was originally written. The new metadata 13 including transient metadata that system 12 generates is extra information that can be used to analyze the internals of the system, and does not need the same level of protection as the original content, and can still work without corrupting the original data and metadata that is important to the client.

In an example, entity 11a monitors data as it moves from the file system over to store 255 and back again and generates an audit log that describes that movement, and entity 11a stores the log inside an XSet and gives the log a name such as CUA audit log. The client does not ask for CUA audit log from the XAM object because the client is not aware of it. But a different application or tool that fetches an X-ray, for example, can request the CUA audit log from the XAM object and that log is returned to the application or tool.

Figure 10:
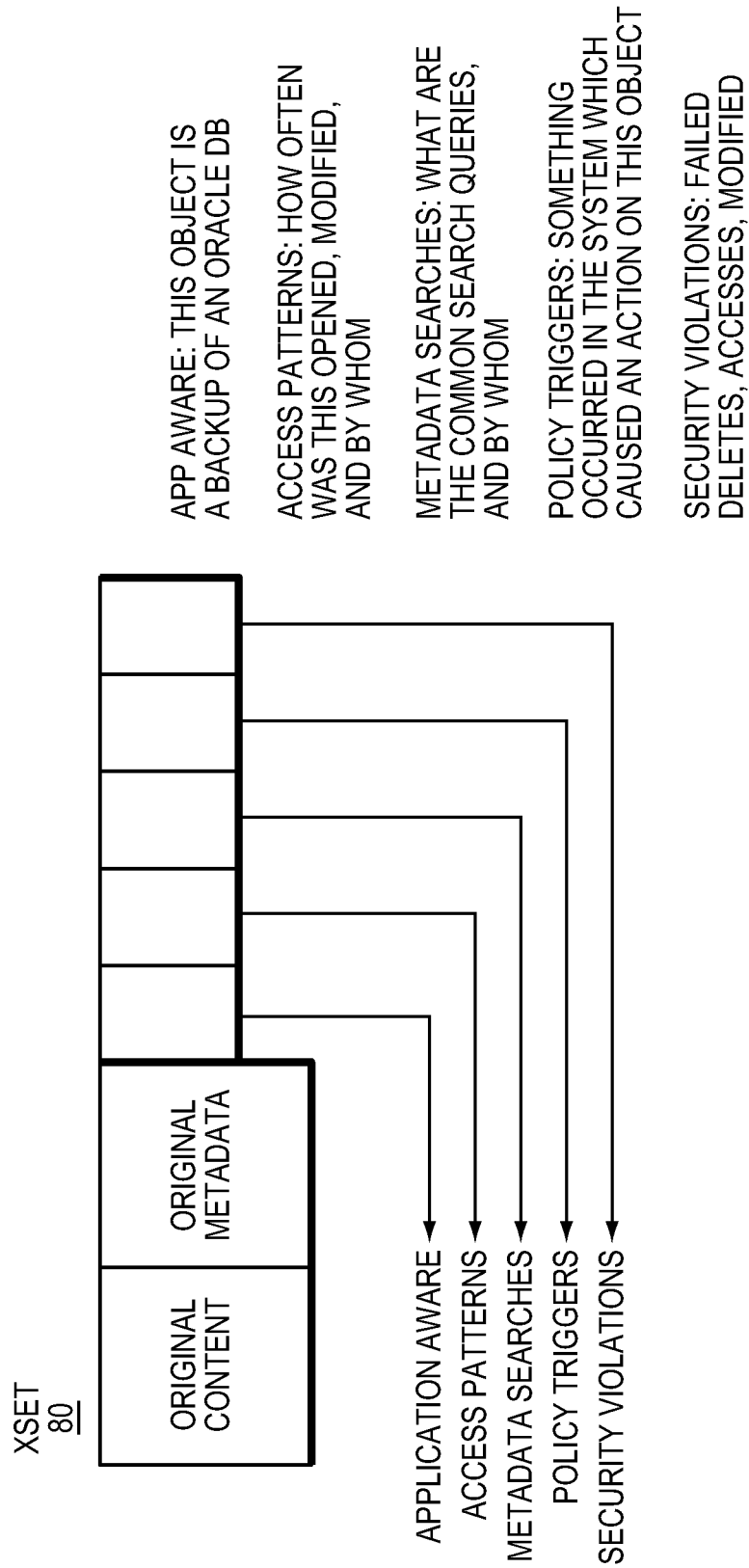

FIG. 10 illustrates examples of different types of transient or internal metadata that can be generated and attached to XAM objects. A first type relates to application awareness; in an example, a set of bits that have been sent to system 12 may be known to be part of an Oracle database (e.g., this may have been indicated during some provisioning of system 12), and metadata indicating this fact can be attached to the corresponding XAM object so that an analysis tool can determine this fact later.

One or more of entities 11a-11f can capture access patterns, e.g., patterns related to CUA services and a file such that anytime anyone opens or modifies that file, entity 11a can capture that and create an audit log and attach that audit log to the corresponding XAM object. In another example, if someone does a search for a file or piece of data (e.g., XAM allows searching), such as a search to locate all objects that contain the keyword "X-ray", when the search comes down, an entity 11a-11f can capture that someone is searching, remember who it was, when the search was done, and attach that metadata to the object.

Policy triggers may be applied such that something occurs in system 12 that causes an action on an object. For example, a retention hold may occur wherein a document was identified as part of a lawsuit and there is a need to prevent deletion of this document; a user or application can trigger a policy, and metadata can be developed to indicate that this trigger happened and such metadata can be attached to the object.

In at least one implementation, anytime anyone attempts to access anything in system, e.g., access, modify, delete, and such attempt fails because of permission controls, metadata can capture that information as well and be attached to corresponding objects.

Figure 11:
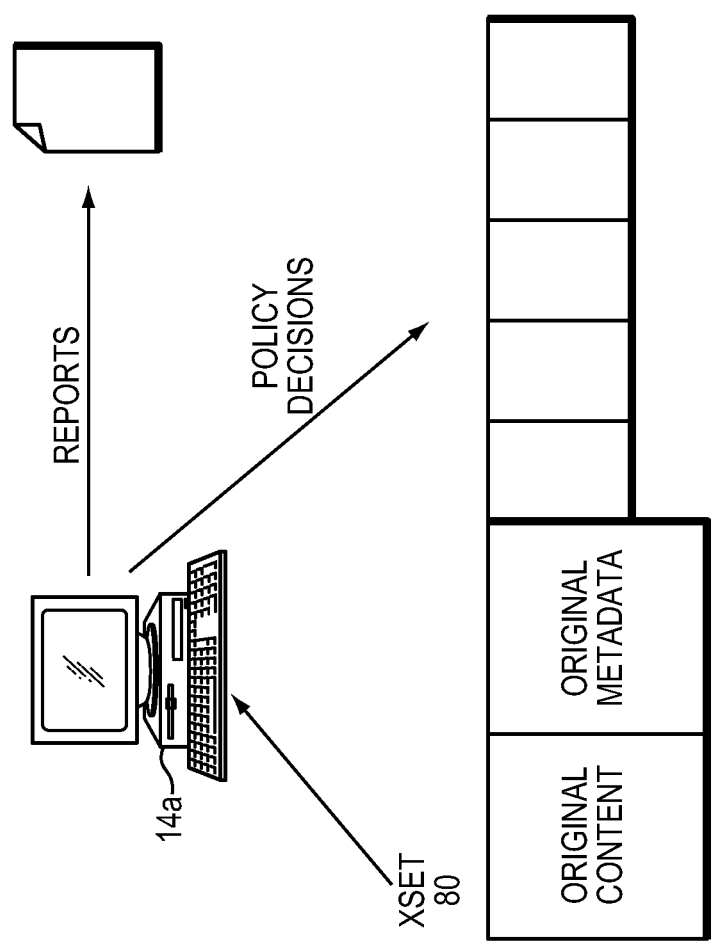

FIG. 11 illustrates that XAM applications can run analytics on the transient metadata. A client application that is aware of metadata 13 can look at an XSet and request fields that the application knows may be available and can generate reports. For example, the application can analyze audit logs and determine that someone is trying to compromise a particular file, and generate a warning. In another example, an application can examine access patterns, determine that a file is being accessed frequently, and suggest or cause the file to be moved to higher performance (e.g., flash) memory. These capabilities can be achieved no matter which protocol the content came in on, due to the other system 12 characteristics as described above.

System 12 can also make policy decisions, e.g., deciding to delete a file if it is consuming resources excessively, based on transient metadata.

Figure 12:
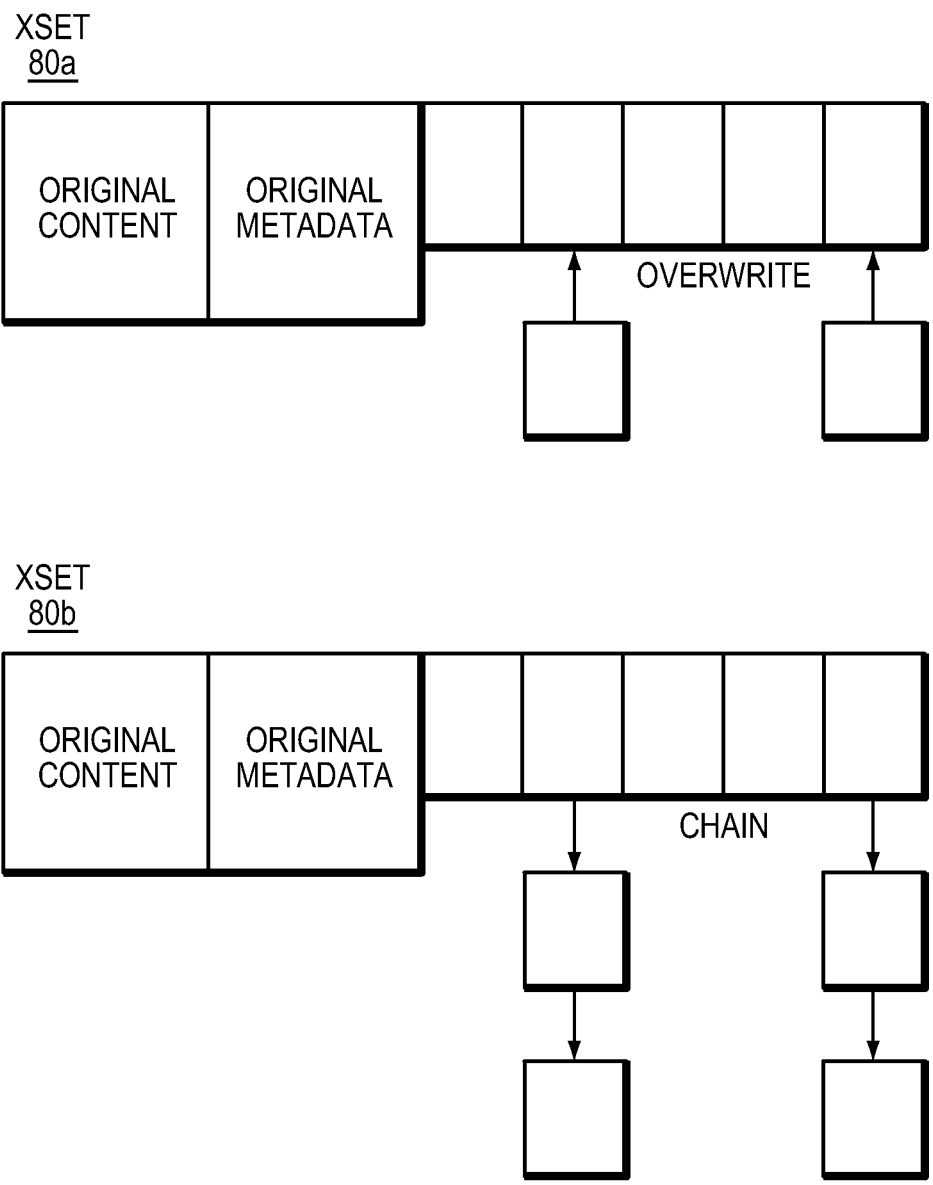

FIG. 12 illustrates that there may be at least two different ways of updating metadata 13: (1) over time, such metadata may be replaced in XSet 80a by overwriting (e.g., an audit log can be overwritten each week) or (2) some chaining can be performed, such that any time there is a new audit log or a new piece of information, the new log or piece can be stored as a separate file or separate object and can be linked to the XSet 80b, so that when analytics are run, a more robust historical set of transient metadata is available for analysis.

With respect to how metadata 13 is attached or linked to an XSet, for example, in FIG. 8 the content may be written by a client and represents an X-ray, and the additional information includes a patient name. The client generates this content and additional information using XAM. In an example, the client requests "create XSet", requests "xset.createstream", gives the new XSet a name "X-ray" and gives it X-ray data, then requests "xset.createfield", gives the new field a name "patientname, John Doe", and requests "xset.commit". At that point the object flows down into the storage system, and XUID "abc123" is created and is returned to the client. Now the client knows it has an XSet on the storage system, and all the client has to do is submit the XUID field to access the X-ray. The same process can happen internally inside system 12 with CUA services acting as the client if a file comes in as a file system or tape request. With reference to FIG. 9, one or more of entities 11a-11f may be aware of XUID "abc123" and when it is time for such an entity to attach audit info, the entity requests "xset.open" and submits the XUID, and can start attaching additional streams of data and additional metadata fields. In this way, secret additional fields are added into the original XSet that can be accessed by specialized tools can have access no matter which protocol was used to stored the content. In this way, an enhanced version of the XSet is created with a rich set of system specific metadata that can get attached transiently regardless of the original protocol used.

Figure 13:
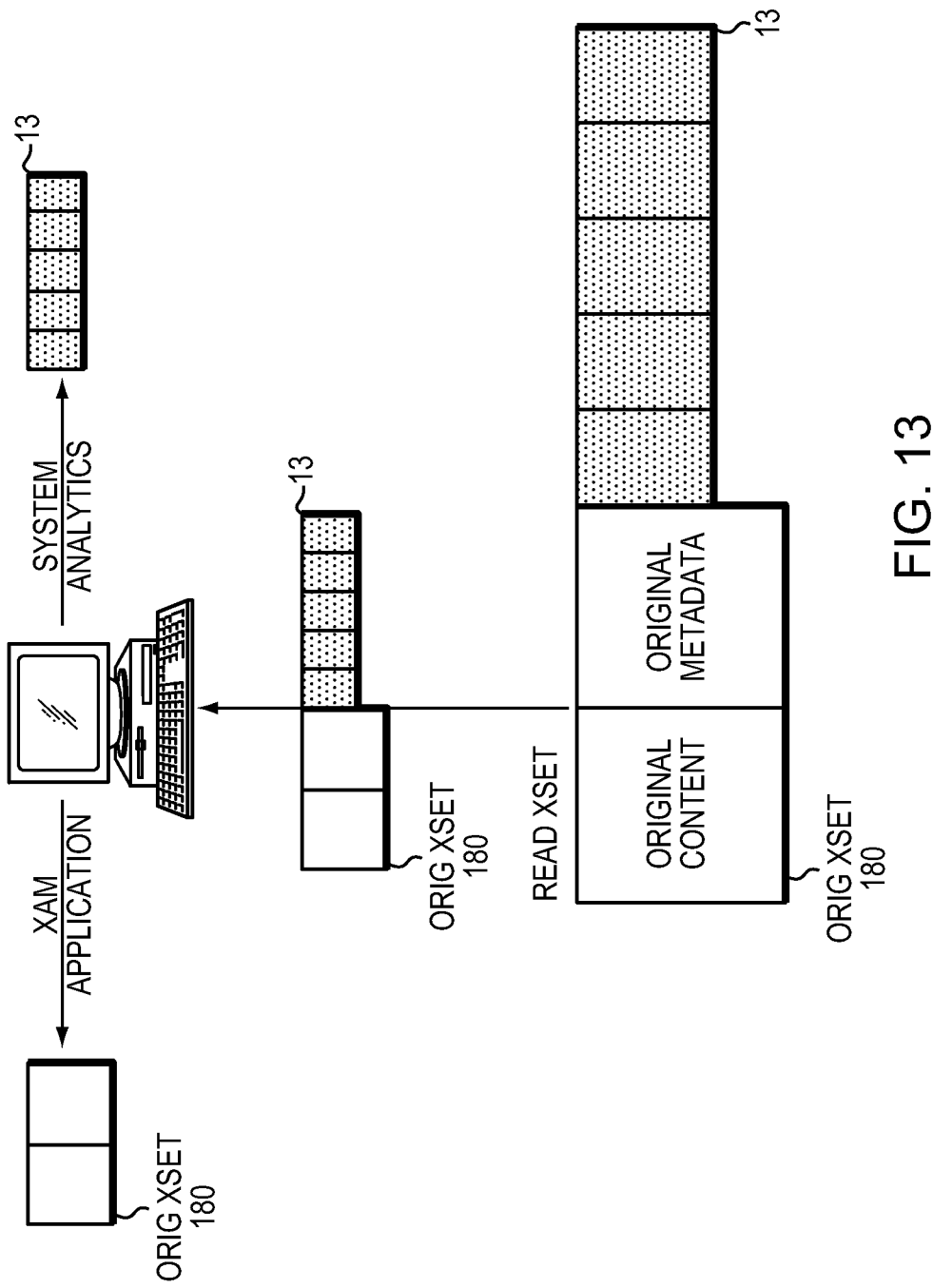
Figure 14:
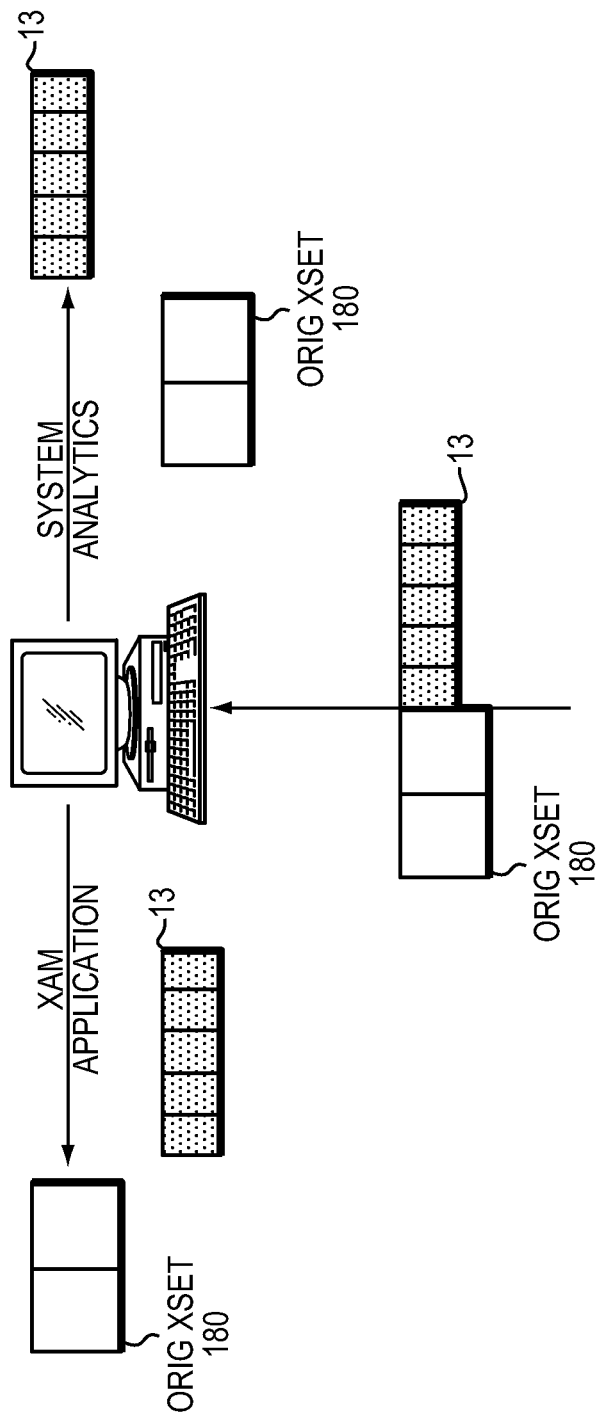

With reference to FIGS. 13-14, in at least some cases, use of processes described above correspond to a "Fetch All" scenario in which any application (e.g., a medical application) accessing original content (e.g., an X-ray) of an object, such as original XSET object 180, also has access to transiently attached metadata such as metadata 13, and likewise any client (e.g., a system analytics application) accessing such metadata 13 also has access to such original content of the object. Thus an access control or other security measure that is effective only at an object-by-object level cannot prevent such a "Fetch All" scenario, which can be of interest for security or compliance reasons.

The technique described herein may be used to help provide access control at a sub-object level, e.g., via security zones inside an XSET object, so that, for example, different parts of the system can generate metadata to attach to the XSET object with some control over access to such generated metadata.

Figure 15:
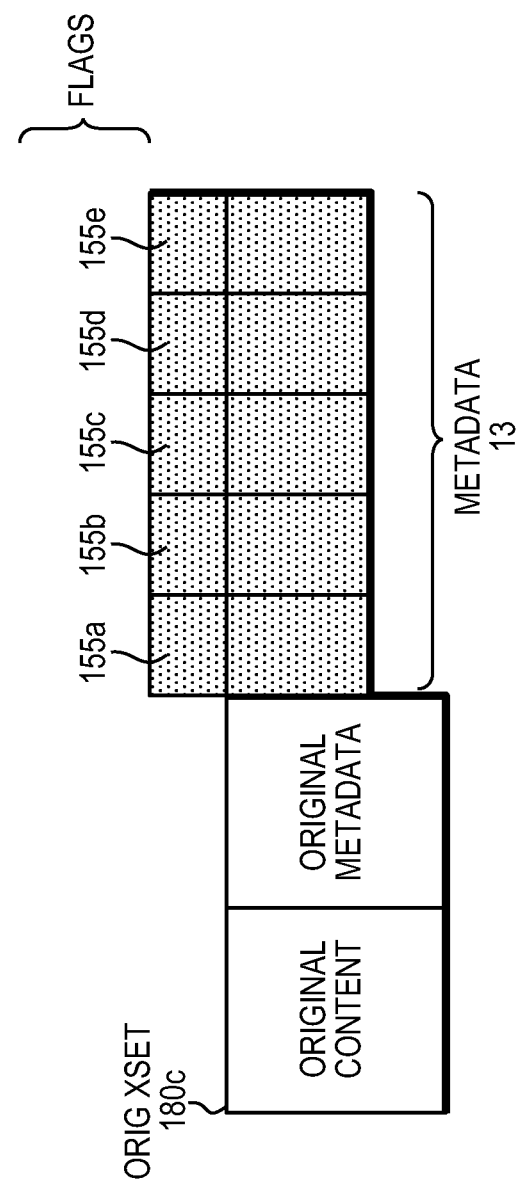

With reference to FIG. 15, in at least one aspect of the technique, fields within metadata 13 have respective flags (also referred to as tags) 155a-155e to indicate that such fields are automatically generated internally to the system, e.g., by entities 11a-11f as described above.

For example, such a field may represent or include an access log keeping a running tally of every time an application requests an X-ray object, which application read the object, which part of the object was read, and when. In accordance with this aspect of the technique, when such a field is attached to the object, a corresponding flag (e.g., flag 155a) is set to indicate that this is an auto-attach or internal attachment, as shown by example below.

<Stream name="access log" auto-attach="true">

This flag can then be checked when the object is accessed so that filtering can be performed at one or more levels to help prevent undesired exposure of a field of metadata 13 or another subset of the object.

For example, such filtering may be performed within the system. In a specific example, an application requests (e.g., by unique object identifier) to read an entire Xset object having an X-ray as original content. Centera protocol or XAM API determines that the application is an authenticated, logged-in medical application, determines that such an application does not have permission to read any metadata 13 with flags 155a-155e set, and filters out or strips off any such metadata 13 before returning the Xset object to the application. Such metadata may include, for example, name value pairs or files containing detailed logs.

Depending on the implementation, if the application specifically requests metadata 13 for which (according to flags 155a-155e) the application lacks permission to access, Centera protocol or XAM API returns an error indicating no such metadata.

Centera protocol and XAM API are aware of authentication that has occurred between the requesting application and the system and on the basis of that authentication and flags 155a-155e, Centera protocol and XAM API can help prevent unnecessary exposure of metadata 13 outside the system.

In another example, such filtering may be performed outside the system by XAM software development kit (SDK) software upon which the requesting application relies for interaction with the system. In this example, in at least some implementations, all of the requested Xset object, including original object 180 and metadata 13, is returned to the XAM SDK software which determines that the application does not have permission to read any metadata 13 with flags 155a-155e set, and filters out or strips off any such metadata 13 before passing any of the Xset object on to the application. Thus, by use of the XAM SDK software within the application, the application's access to contents of metadata 13 can be blocked by use of flags 155a-155e.

In at least some cases, performing such filtering by the XAM SDK software is a less secure method of access control than performing such filtering by the system itself, because metadata 13 is delivered out of the system even though it is not accessible by the application.

In another example, flags including flags 155a-155e are fields that indicate specifically which application or applications can access corresponding pieces of metadata 13. Thus, for example, original object 180 may include X-ray content and may have a flag indicating that authorization is "medical application", as shown by example in the first line listed below.

<Stream name="Xray" auth="medical">
<Stream name="access log" auth="storageadmin">

Thus in such a case an analytics application reading the object cannot access "Xray" of original content 180, and the system returns an error if the analytics applications attempts such access. Correspondingly, a medical application reading the object cannot access "access log" of metadata 13, and the system returns an error if the medical application attempts such access.

Such flags 155a-155e can also be used to help prevent one analytics application from accessing certain pieces of metadata 13 (e.g., data about access patterns, policy triggers, or application awareness) that are designated by the flags to be accessible only to another analytics application. Thus in the latter case each of several analytics applications may have access only to a respective subset of metadata 13 as indicated by flags such as flags 155a-155e. And as described above, such access control may be performed by Centera protocol or XAM API within the system, or by XAM SDK software outside the system.

Figure 16:
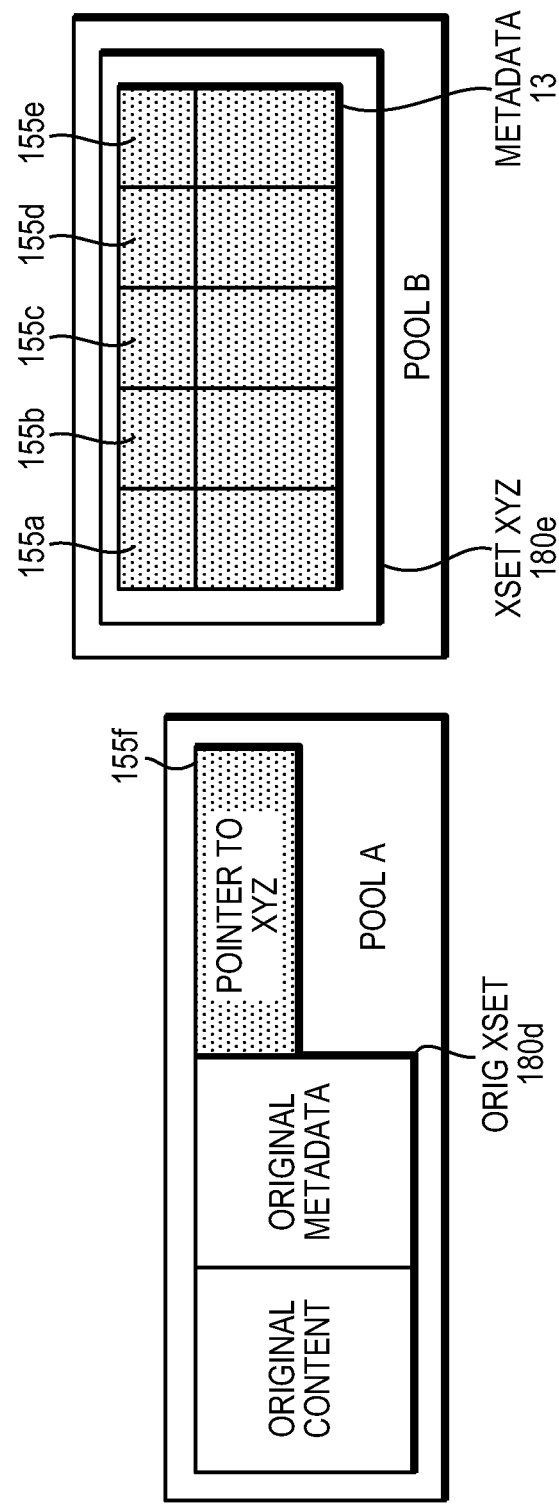

With reference to FIG. 16, in at least another aspect of the technique, the system uses object-by-object level access control to help provide sub-object level access control. Metadata 13 for original object 180d is stored in object 180e, and objects 180d and 180e are stored in different object pools PoolA and PoolB respectively. Object 180d has a pointer flag 155f to object 180e so that an application that has access to PoolA and object 180d can request metadata 13 by reading an object identifier for object 180e from pointer flag 155f, and using such object identifier to issue a request to the system for object 180e. If the application lacks access to PoolB, such request is not successful. In at least some implementations, the system may segregate sub-object data generally by object pool. In such implementations, the system may have an object pool for each analytics application and object 180d may have additional pointer flags to other objects in other object pools so that each analytics application has access only to pieces of metadata 13 that are stored in corresponding objects in the analytics application's own object pool.

As shown in FIG. 16, this aspect may also be combined with the previous aspect so that flags 155e-155f provide further access control as described above in addition to the use of object pools.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |

TABLE 1-continued

| Title | Ser. No. | Filing Date |
|---|---|---|
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus For Managing A File System On A Content Addressable Storage System | 11/324,533 | Jan. 3, 2006 |
| Methods And Apparatus For Creating A File System | 11/324,637 | Jan. 3, 2006 |
| Methods And Apparatus For Mounting A File System | 11/324,726 | Jan. 3, 2006 |
| Methods And Apparatus For Allowing Access To Content | 11/324,642 | Jan. 3, 2006 |
| Methods And Apparatus For Implementing A File System That Stores Files On A Content Addressable Storage System | 11/324,727 | Jan. 3, 2006 |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For Accessing Content On A Storage System | 11/324,644 | Jan. 3, 2006 |
| Methods And Apparatus For Transferring Content From A Storage System | 11/392,969 | Mar. 28, 2006 |
| Methods And Apparatus For Requesting Content From A Storage System | 11/391,654 | Mar. 28, 2006 |
| Methods And Apparatus For Transferring Content To Multiple Destinations | 11/392,981 | Mar. 28, 2006 |
| Methods And Apparatus For Receiving Content From A Storage System At Multiple Servers | 11/390,878 | Mar. 28, 2006 |
| Methods And Apparatus For Transferring Content From An Object Addressable Storage System | 11/390,564 | Mar. 28, 2006 |
| Methods And Apparatus For Requesting Content From An Object Addressable Storage System | 11/391,636 | Mar. 28, 2006 |
| Methods And Apparatus For Conversion Of Content | 11/438,770 | May 23, 2006 |
| Methods And Apparatus For Selecting A Data Format For A Content Unit | 11/439,025 | May 23, 2006 |
| Methods And Apparatus For Accessing A Content Unit On A Storage System | 11/439,022 | May 23, 2006 |
| Methods And Apparatus For Enabling Selection Of A Content Unit Data Format | 11/438,817 | May 23, 2006 |
| Methods And Apparatus For Accessing Content | 11/474,658 | Jun. 26, 2006 |
| Methods And Apparatus For Providing Access To Content | 11/474,846 | Jun. 26, 2006 |
| Methods And Apparatus For Retrieving Stored Content | 11/474,655 | Jun. 26, 2006 |
| Methods And Apparatus For Accessing Content Through Multiple Nodes | 11/474,661 | Jun. 26, 2006 |
| Methods And Apparatus For Receiving Content | 11/474,719 | Jun. 26, 2006 |
| Methods And Apparatus For Processing Access Requests | 11/474,749 | Jun. 26, 2006 |
| Methods And Apparatus For Providing Content | 11/474,802 | Jun. 26, 2006 |
| Methods And Apparatus For Managing Content | 11/483,465 | Jul. 10, 2006 |
| Methods And Apparatus For Moving Content | 11/483,799 | Jul. 10, 2006 |
| Methods And Apparatus For Storing Content | 11/483,494 | Jul. 10, 2006 |
| Methods And Apparatus For Caching Content In A Computer System Employing Object Addressable Storage | 11/519,374 | Sep. 12, 2006 |
| Methods And Apparatus For Selection Of A Storage Location For A Content Unit | 11/644,430 | Dec. 22, 2006 |
| Methods And Apparatus For Modifying An Object Identifier For A Content Unit | 11/644,423 | Dec. 22, 2006 |
| Methods And Apparatus For Storing Content On A Storage System | 11/644,174 | Dec. 22, 2006 |
| Methods And Apparatus For Increasing The Storage Capacity Of A Zone Of A Storage System | 11/644,857 | Dec. 22, 2006 |
| Methods And Apparatus For Selecting A Storage Zone For A Content Unit | 11/644,428 | Dec. 22, 2006 |

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in controlling access to eXtensible Access Method (XAM) metadata stored in an object addressable data storage system, the method comprising:
storing, in the object addressable data storage system, an object derived from a set of content, the object having an object identifier;
adding, via the object addressable storage system, storage system specific filtered transiently attached metadata to the object, the storage system specific filtered transiently attached metadata being accessible when the object is retrieved using the object identifier, wherein the metadata includes first fields having respective flags indicating that the fields are automatically generated internally or externally to the object addressable storage system and second fields indicating which application can access respective pieces of metadata; and based on sub-object access control, allowing a retrieving application to have access to only a subset of the object's storage system specific filtered transiently attached metadata and preventing access to at least one other subset of the object's storage system specific filtered transiently attached metadata, wherein sub-object access control is based on flags indicating which applications can access associated pieces of metadata.

2. The method of claim 1, wherein the storage system specific metadata comprises filtered transiently attached metadata within indexed storage systems.

3. The method of claim 1, wherein the object addressable data storage system comprises an indexed storage system that employs object processes to attach metadata to content arriving via different protocols.

4. The method of claim 1, wherein the object addressable data storage system comprises an indexed storage system that automatically adds transient metadata to the set of content.

5. The method of claim 1, wherein a client retrieving the set of content cannot access internally generated transient metadata.

6. The method of claim 1, wherein multiple clients attach metadata that cannot be accessed by other clients.

7. The method of claim 1, wherein security zones are provided inside an XSET object.

8. The method of claim 1, wherein different parts of the object addressable data storage system can generate metadata to attach to an XSET object with control over access to such generated metadata.

9. The method of claim 1, wherein fields within metadata have respective flags to indicate that such fields are automatically generated internally.

10. The method of claim 1, wherein a field represents an access log keeping a running tally of every time an application requests an object, and when the field is attached to the object, a corresponding flag is set to indicate that this is an internal attachment.

11. The method of claim 1, wherein a flag is checked when an object is accessed so that filtering is performed to help prevent undesired exposure of a field of metadata of an object.

12. The method of claim 1, wherein filtering of metadata is performed within the system.

13. The method of claim 1, wherein an application requests to read an entire Xset object, the application is an authenticated, logged-in application, it is determined that the application does not have permission to read any metadata with flags set.

14. The method of claim 1, wherein an application requests to read an entire Xset object, and metadata is filtered out before the Xset object is returned to the application.

15. The method of claim 1, wherein if an application specifically requests metadata for which the application lacks permission to access, an error is returned indicating no such metadata.

16. The method of claim 1, wherein authentication that has occurred between a requesting application and the object addressable data storage system helps prevent unnecessary exposure of metadata outside the system.

17. A system for use in controlling access to eXtensible Access Method (XAM) metadata stored in an object addressable data storage system, the system comprising:

first hardware logic configured to store, in the object addressable data storage system, an object derived from a set of content, the object having an object identifier;

second hardware logic configured to add, via the storage system, object addressable storage system specific filtered transiently attached metadata to the object, the storage system specific filtered transiently attached metadata being accessible when the object is retrieved using the object identifier, wherein the metadata includes first fields having respective flags indicating that the fields are automatically generated internally or externally to the object addressable storage system and second fields indicating which application can access respective pieces of metadata; and third hardware logic configured to allow, based on sub-object access control, a retrieving application to have access to only a subset of the object's storage system specific filtered transiently attached metadata and to prevent access to at least one other subset of the object's storage system specific filtered transiently attached metadata, wherein sub-object access control is based on flags indicating which applications can access associated pieces of metadata.

18. The system of claim 17, wherein the storage system specific metadata comprises filtered transiently attached metadata within indexed storage systems.

19. The system of claim 17, wherein the object addressable data storage system comprises an indexed storage system that employs object processes to attach metadata to content arriving via different protocols.

20. The system of claim 17, wherein the object addressable data storage system comprises an indexed storage system that automatically adds transient metadata to the set of content.

* * * * *